G. A. ANDERSON.
DRAFT APPLIANCE FOR PLOWS.
APPLICATION FILED DEC. 3, 1909.
976,024.
Patented Nov. 15, 1910.
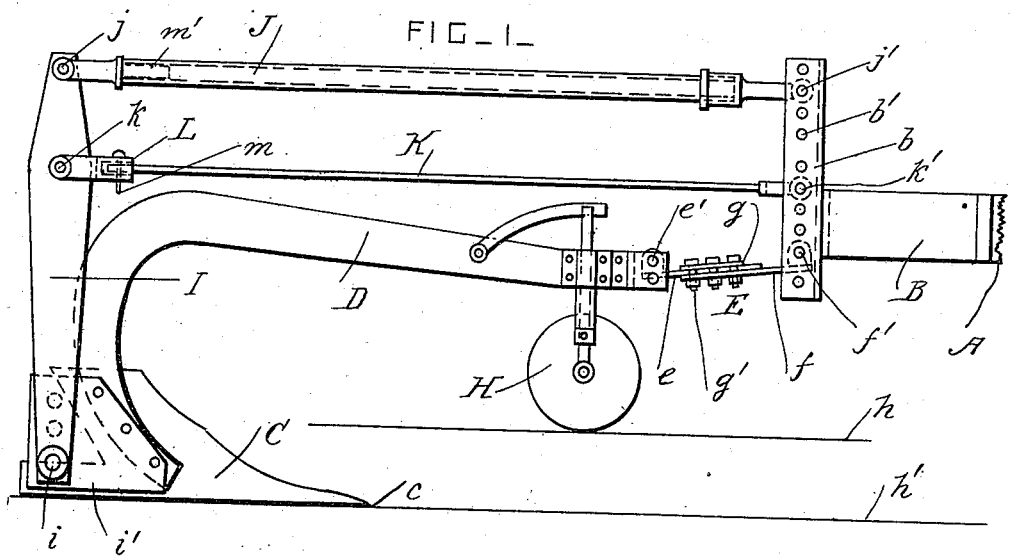
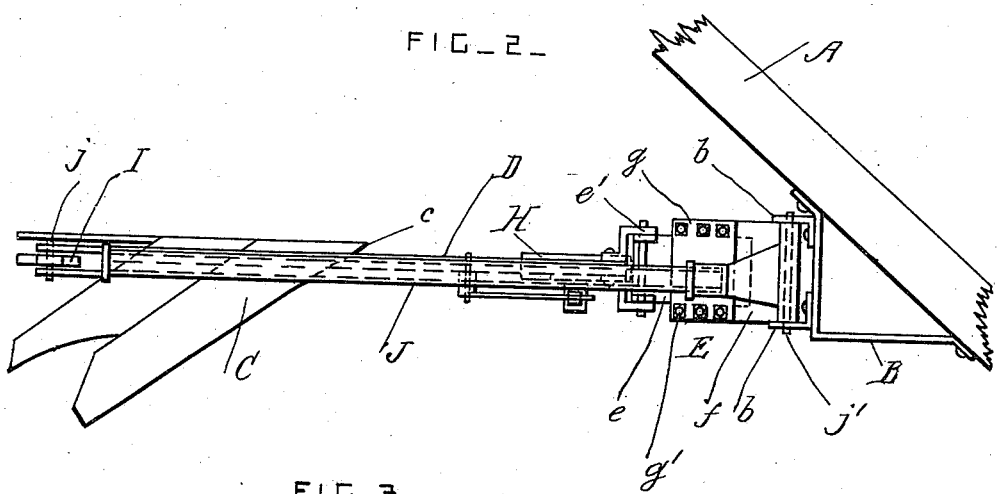
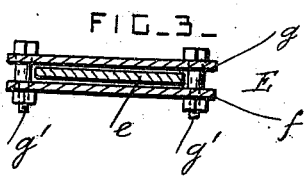
Witnesses
Walter Allen
Inventor
Gustaf Arvid Anderson.
By
Herbert W. T. Jenner.
Attorney

UNITED STATES PATENT OFFICE.

GUSTAF ARVID ANDERSON, OF WAYNESBORO, PENNSYLVANIA.

DRAFT APPLIANCE FOR PLOWS.

976,024.

Specification of Letters Patent.

Patented Nov. 15, 1910.

Application filed December 3, 1909. Serial No. 531,180.

*To all whom it may concern:*

Be it known that I, GUSTAF ARVID ANDERSON, a citizen of the United States, residing at Waynesboro, in the county of Franklin and State of Pennsylvania, have invented certain new and useful Improvements in Draft Appliances for Plows; and I do hereby declare the following to be a full, clear, and exact description of the invention, such as will enable others skilled in the art to which it appertains to make and use the same.

This invention relates chiefly to gang-plows, and it consists in appliances for connecting the plows with the draft-beam, as hereinafter fully described and claimed, so that the plows are pushed through the ground instead of being pulled through it.

In the drawings, Figure 1 is a side view of a plow provided with draft appliances according to this invention. Fig. 2 is a plan view of the same. Fig. 3 is a cross-section through the coupling E, drawn to a larger scale.

A is a portion of the draft-beam of a gang-plow arranged in a diagonal position and drawn along by a traction-engine in the usual way.

B is a draft-bracket secured to the draft-beam A, and provided with two vertical plates $b$ having rows of holes $b'$ for the attachment of the plow and its draft appliances. The parts $b$ constitute a draft-member by means of which the plow is drawn along, and the construction of this draft-member may be varied in any approved manner.

C is the plow having a point $c$ and constructed of any approved form.

D is the plow-beam having its rear end portion secured to the plow.

E is a telescopic or longitudinally-slidable coupling between the front end portion of the plow-beam and the draft-bracket B. This coupling is formed of two coupling-members $e$ and $f$, which are pivoted to the plow-beam and to the draft-bracket by pins $e'$ and $f'$ respectively. The coupling-member $f$ is provided with a socket in which the coupling-member $e$ is free to slide longitudinally. This socket is formed of a plate $g$ and the plate which forms the main portion of the coupling-member $f$. These two plates are secured together by bolts $g'$ or other suitable fastening devices, so that the coupling-member $e$ can slide freely between them, but cannot twist or revolve. The pivot pins $e'$ and $f'$ permit the front end portion of the plow-beam to move up and down freely.

H is a gage-wheel which supports the front end portion of the plow-beam from the ground, and which is connected to the plow-beam in any approved manner. The line $h$ indicates the surface of the ground, and the line $h'$ indicates the bottom of the furrow in the ground.

I is a draft appliance or pushing-bar which is arranged in a substantially vertical position behind the plow. The lower end portion of the pushing-bar I is pivoted by a pin $i$ to a bracket $i'$ secured to the rear part of the plow.

J is a draft appliance or strut preferably formed of a tubular bar or rod, and pivoted between the upper end portions of the pushing-bar and the draft-bracket B by pins $j$ and $j'$, and having a slip-joint $m'$.

K is a draft appliance comprising a tie-bar or rod pivoted between the pushing-bar and the draft-bracket by pins $k$ and $k'$, and arranged under the strut J.

L is a joint in the rod or bar K provided with a frangible pin $m$ which is arranged to be sheared through when the plow strikes a large rock or other similar obstruction.

The parts I, J and K constitute draft-appliances which are connected to the draft-member $b$ $b$, by means of which the plow is drawn along, and the part I is pivotally connected with the rear end portion of the plow at a point behind the plow-point and adjacent to the bottom edge of the plow.

The plow rests on the bottom of the furrow, and when the draft-beam A is drawn along, by means of the draft-member $b$ $b$, the plow is pushed through the ground by the pushing-bar I, the force being applied to the rear of the point of the plow, on its line of draft, and as near as possible to the bottom of the furrow. The pushing-bar I is drawn along by the two draft-rods J and K, and the various pivot-pins permit the plow to have the requisite freedom of movement in a vertical direction. When the power is applied to the plow in this manner, the plow is less liable to be diverted from its proper path by obstacles, than when the plow is pulled along by its plow-beam.

What I claim is:

1. The combination, with a draft-member, of a plow, a plow-beam having its rear end rigidly secured to the said plow, a slidable coupling between the front end of the plow-beam and the draft-member, a pushing-bar pivoted to the rear part of the plow behind its point, draft-rods arranged at different levels and pivotally connected with the said pushing-bar and draft-member, and means for supporting the front end portion of the plow-beam.

2. The combination, with a draft-member, of a plow provided with a plow-beam, a slidable coupling between the plow-beam and the draft-member, a pushing-bar pivoted to the rear part of the plow behind its point, a strut pivoted between the upper parts of the pushing-bar and the draft-member, a tie-bar arranged below the said strut and also pivoted between the pushing-bar and the draft-member and provided with a frangible joint, and means for supporting the front end portion of the plow-beam.

3. The combination, with a draft-member, of a plow, a plow-beam having its rear end rigidly secured to the plow and having its front end operatively connected with the said draft-member, and jointed bars operatively connected with the said draft-member and pivoted to the rear end portion of the plow behind its point and adjacent to its bottom surface.

In testimony whereof I have affixed my signature in the presence of two witnesses.

GUSTAF ARVID ANDERSON.

Witnesses:
H. E. KULMER,
J. STOVER PRICE.